United States Patent

[11] 3,609,373

[72] Inventors Dhimat R. Desai
Somerville;
Carl T. Aquilino, Middlesex, both of N.J.
[21] Appl. No. 38,281
[22] Filed May 18, 1970
[45] Patented Sept. 28, 1971
[73] Assignee The Singer Company
New York, N.Y.

[54] PHOTOELECTRIC SENSORS AND CIRCUITRY FOR EDGE-GUIDING SYSTEMS FOR SEWING MACHINES
11 Claims, 5 Drawing Figs.

[52] U.S. Cl. ................................................. 250/202,
112/121.11, 112/121.12
[51] Int. Cl. ............................................... G05b 5/00
[50] Field of Search ........................................ 250/202;
112/121.11, 121.12

[56] References Cited
UNITED STATES PATENTS

| | | | |
|---|---|---|---|
| 3,072,081 | 1/1963 | Milligan et al. | 112/121.12 |
| 3,385,245 | 5/1968 | Ramsey et al. | 250/202 X |
| 3,459,145 | 8/1969 | Ramsey et al. | 250/202 X |
| 3,495,089 | 2/1970 | Brown | 250/202 X |

Primary Examiner—Archie R. Borchelt
Attorneys—Marshall J. Breen and Chester A. Williams, Jr.

ABSTRACT: A photoelectric sensor system is described for generating information signals related to the actual edge position, transparency and edge curvature of the material to be sewn by a sewing machine in an edge-guiding system. Photodiodes, preferably of the PIN type, are used in a bar-type geometry for the sensors which have a special spaced arrangement relative to the needle. Signal processing involving operational amplifiers is used in connection with a reference sensor which continuously monitors the material transparency to correct for the transparency error and produces a single steering servo signal which is a true measure of edge position deviation from a desired position. A plurality of sensors, positioned in increasingly spaced relation to and in advance of the needle, generate signals related to the edge positional error at these advanced positions. These error signals are then processed by special circuits to yield signals containing advanced edge curvature information at the various sensor positions. Finally a single composite signal is derived from the component signals with proper weighting of the contribution of each component signal to the composite signal in accordance with the relative distances of the sensors from the needle. This composite signal may be derived as a voltage or as a current and then used to control the optimum feeding rate of the sewing machine by any conventional speed control system which responds proportionally to the variation of a single signal. The edge curvature information is thus continuously updated in advance of the needle so that the feed rate can be changed in time responsively to the curvature complexity to permit more or less time as needed for the steering servo to make proper correction just before each stitch is made.

PATENTED SEP 28 1971

INVENTORS
Dhimat R. Desai
Carl T. Aquilino

BY Marshall J. Breen
ATTORNEY

PHOTOELECTRIC SENSORS AND CIRCUITRY FOR EDGE-GUIDING SYSTEMS FOR SEWING MACHINES

BACKGROUND OF THE INVENTION

Prior art edge-guiding systems for sewing machines are known in which photosensors are variably illuminated by light interrupted by the shifting edge portions of the material to be guided. A serious limitation in these prior art systems is the fact that they are useful only with material which is opaque to light or nearly so because they are based upon an error signal which is controlled only by the amount of light received by the sensor as controlled by the edge position. Thus, materials having variable transparency to light because of thickness, texture and color, such as are commonly used in the sewing trades, could not be successfully handled by such a system because the amount of light received by the sensor would be a function not only of the edge position but also of the material transparency and the system interprets the light received due to transparency as a positional error and would make a false correction and produce a variable margin. What is needed is some means for deriving continuous information related to the transparency of the material and for using this information to modify the error signal so that it is a true measure of the positional error of the edge.

It is also known in prior art edge-guiding systems for sewing machines to provide means for controlling the material feed rate in accordance with the degree of curvature of the edge sensed at a point in advance of the needle. Essentially only two feeding rates are available responsively to whether a single sensor is covered or uncovered. It has been found that, by this means, insufficient curvature information is derived to enable good control having the desired resolution. This results either in too slow a feed rate for efficient production or in too fast a feed rate for accurate steering. What is needed is more advanced curvature information and means for combining this information in a manner which provides a single feed rate control signal which is a known function of the complexity of the edge curvature as sampled simultaneously at several positions in advance of the needle so that proportional control over a wide range of feed rates can be obtained.

SUMMARY OF THE INVENTION

It is therefore a primary object of the present invention to provide photoelectric means for generating a signal for controlling the servo steering of material in an edge-guiding system for sewing machines, which signal is a reasonably true measure of the positional error of the edge regardless of variations in the transparency of the material being sewn.

It is a further object of this invention to provide, in an edge-guiding system of the above type, light-sensing means for deriving a servo steering signal containing components related both to the positional error of the edge and to the transparency of the material and additional circuit means including a reference sensor for modifying said signal to remove the component therefrom related to the transparency so that the true positional error signal remains.

It is another object of this invention to provide, in an edge-guiding system, means for deriving a signal for controlling the feed rate in accordance with advanced edge curvature information sampled by a plurality of spaced sensors.

It is a further object of this invention to provide, in a sewing machine edge-guiding system, photoelectric sensing means for deriving a steering servo signal which is compensated for the light transmission through partially transparent material and for deriving a composite feed rate control signal which is a function of the curvature complexity of the edge as sampled at a plurality of points along the edge in advance of the needle.

In attaining the objects of this invention, a plurality of photoelectric sensors, preferably PIN photodiodes, are embedded in the cloth plate or work-supporting surface of the sewing machine in the vicinity of the needle hole and present a surface flush with the work-supporting surface and are partially covered by the edge portion of material to be sewn in the normal operation of the sewing machine. The sensors all have a bar configuration and each one, except for the reference sensor later described, extends laterally on both sides of a reference edge position defined by a straight line parallel to the direction of feed and passing through a point offset from the needle hole. A single reference sensor is positioned to be entirely covered by the material to be sewn in normal operation and is located offset from but abreast of the needle hole in the direction of feed.

A single light source is arranged to illuminate the sensors by direct transmission to the uncovered portions and by transmission through the material, in accordance with its transparency, to the covered portions thereof. The bar sensor nearest the needle hole is used to generate a servo signal for controlling the steering of the material so that the edge is positioned at the same distance from the needle hole before each stitch is made. A conventional operational amplifier having a summing point is used to provide an output signal. The output signal, as thus derived, contains the true positional error signal multiplied by a factor related only to the transparency of the material. A reciprocal factor is generated by a circuit in which the reference sensor alone supplies the input signal. This circuit controls the light output of a lamp which in turn controls the resistance of a photocell which forms the series input resistance of a multiplier circuit which multiplies the output signal derived from the first sensor by the reciprocal factor to obtain a steering servo signal which is independent of the transparency and thus is a true measure of the positional error.

The other sensors, further removed from the needle hole, are used to generate edge position error signals in the same manner and are corrected in the same manner for transparency as above described for the first sensor. These signals are combined in a special way to produce a composite feed rate control signal which represents the complexity of the upcoming edge curvature. It has been determined that this complexity is a function of the sum of the absolute differences between the signals from successively adjacent sensors but that these differences should each be weighted in a manner inversely related to the distance of the respective sensors from the needle hole as measured in the line of feed. Thus, special signal processing and combining means are used for obtaining absolute differences and for properly weighting those differences to derive a composite signal for controlling the feed rate such as by any conventional speed control of the driving motor of the sewing machine which control responds proportionally to a varying signal.

DESCRIPTION OF THE INVENTION

In the drawings:

FIG. 2a is a detail view of one of the photosensors of FIG. 1.

FIG. 2b is a diagram of a typical circuit for deriving a corrected output signal from the photosensor illustrated in FIG. 2a.

Figure 1:
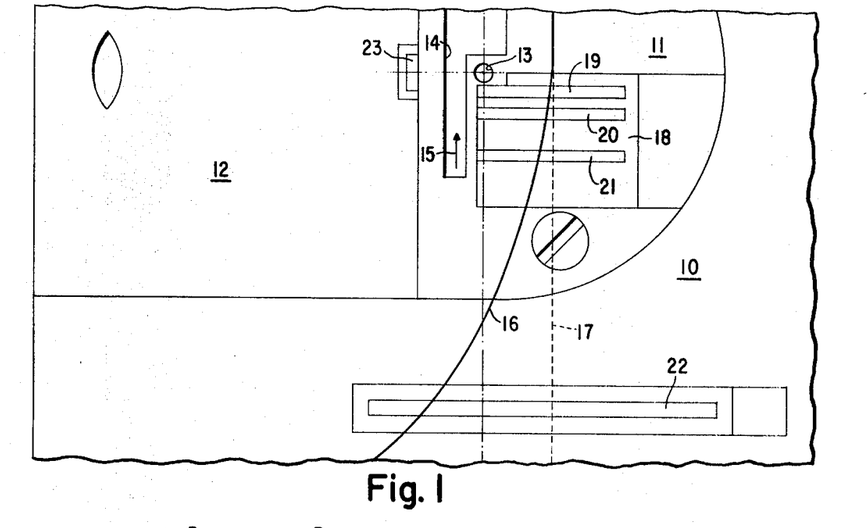
FIG. 1 is a plan view illustrating the arrangement of the photosensors as related to the needle hole, cloth-supporting surface and direction of feed of a sewing machine in accordance with an embodiment of this invention.

Referring now to FIG. 1, a sewing machine is shown having a bed plate 10, a cloth plate 11 and a throat plate 12. The cloth plate 11 is formed with a needle hole 13 and a slot 14 for the feed dog, all in conventional manner. The normal direction of feed is indicated by the arrow 15. The line 16 indicates the actual edge of material being sewn and the dashed line 17 indicates a reference or desired edge position which is established in a manner later to be described in detail.

Embedded in the cloth plate 11 is a package 18 containing three identical photosensors 19, 20 and 21 each having the elongated bar configuration shown. A single photosensor 22 is embedded in the bed plate 10 and is the most remote sensor relative to the needle hole 13. The sensors 19–22 are located at successively increasing distances in advance of the needle hole 13 as measured in the direction of feed and each extends laterally on both sides of the imaginary line 17 which is offset by the marginal distance from the needle hole 13 to define a median reference edge position. This enables a predetermined edge position to be set to the right or to the left of the line 17 for controlling the margin of the line of stitches relative to the edge 16 as will be described.

The sensor 19 is used for detecting the positional error of the edge 16 and so must be located one stitch length ahead of or in advance of the needle to yield a theoretical error of zero. This is so because the cloth is rotated around the needle axis when the needle is down and then it is fed forward by one stitch length. During this feed, no steering correction takes place. Therefore, the edge of the cloth one stitch length ahead of the needle is the point that must be set in the desired position. However, for this condition to be realized for all stitch lengths, a movable sensor would be required. It was decided, however, that the error resulting from the deviation from the desired one stitch length criteria would be small and within permissible tolerance. Therefore the sensor 19 is placed one average stitch length ahead of the needle hole 13, such average length corresponding to 11 stitches per inch.

The sensors 20, 21 and 22 are used for controlling the speed of the motor driving the sewing machine and so affect the feed rate. The location of these sensors is determined from the decelerating characteristics of the sewing machine and they are placed ahead of the needle so as to give the sewing machine sufficient time to decelerate to the appropriate speed to permit steering correction for more complex edge contours as signalled by the sensors.

A reference sensor 23 is positioned to the left of, but abreast of the needle in an area that would most likely be covered by the cloth material at all times during a normal sewing operation. This sensor 23 is used to monitor the material transparency so as to supply information used to correct the signals from sensors 19–22 so that they contain information related *only* to the positional error of the edge.

The required properties of the sensors of this system are as follows:
1. The electrical output should be directly proportional to the product of sensitive surface area and the light intensity integrated over the entire sensitive area.
2. The sensitivity should be uniform over the exposed area.
3. The sensitivity should be essentially constant over a wide range of wave lengths in the visible spectrum to render the sensor nondescriminatory as to color.
4. The response should be fast.

It was discovered that the PIN-type Schottky-Barrier photodiodes have the required characteristic enumerated above and represent the preferred type of sensors. The bar-type geometry for the sensor with uniform width provides a signal proportional to the length of the exposed part of the sensor. This is a linear relationship with the length of the element and makes the associated circuit simple.

Thus far there has been described a physical arrangement of photosensors having special material, shape, size and location with respect to sewing machine structure for deriving information signals related to the material to be sewn with respect to its edge position, the complexity of the edge contour and its transparency.

There will now be described circuit means for processing the above information to provide a first signal used to control a steering servo and a second signal used to control the feed rate.

STEERING SERVO SIGNAL

Figures 2A, 2B:
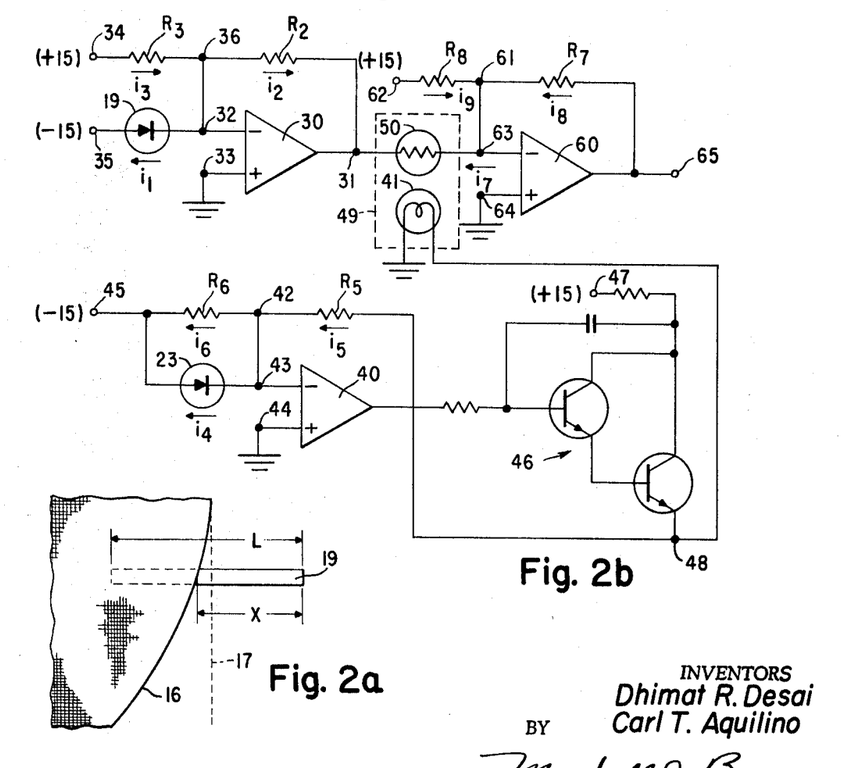

Referring now to FIG. 2b, a conventional operational amplifier 30 has an output terminal 31 and input terminals 32 and 33 of the polarity shown. The circuit connections are conventional for a summing amplifier. A positive bias voltage of 15 volts, for example, is applied at terminal 34 and a negative bias voltage of 15 volts, for example, is applied at terminal 35. $R_2$ is the feedback resistance, $R_3$ is the bias control resistance, and 19 is the sensor as indicated in FIG. 2a. The summing point 36 is connected to terminal 32; terminal 33 is connected to reference ground and the currents are indicated as $i_1$, $i_2$ and $i_3$. In operation, the amplifier 30 holds the voltage at summing point 36 at virtually zero volts as is well known. Thus, writing the node equation at the summing point 36 we have the following:

$$i_2 = i_3 - i_1 \quad (1)$$

The general expression for $i_1$ can be derived from inspection of the sensor 19 as shown in detail in FIG. 2a as follows:

It will be noted that the edge 16 of material being sewn divides the sensor into an exposed part X, and a covered part L−X, where L is total length of the sensor and X is measured from the right-hand end of the sensor.

Assume that the sensor output $= i_1 = I_1$ when the sensor is completely uncovered.

Assume that the material transparency$=Y$, where $Y=0$ represents an opaque material and $Y=0.7$ represents an essentially transparent material.

Then
$$i_1 = I_1 X/L + I_1 Y(L-X)/L \quad (2)$$

where $I_1 X/L$ represents the component generated by the exposed part, and $I_1 Y(L-X)/L$ represents the component generated by the covered part.

Assume that $R_3$ is chosen to make $i_3 = I_1$

Then expression (1) above becomes:
$$i_2 = I_1 - I_1 X/L - I_1 Y(L-X)/L \quad (3)$$
which can be simplified to:
$$i_2 = I_1(1-Y)[1-X/L] \quad (4)$$

The output voltage at terminal 31$=V_1$ and, by operational amplifier action, $V_1 = i_2 R_2$,
therefore $V_1 = I_1(1-Y)[1-(X/L)]R_2 \quad (5)$ Inspection of output signal $V_1$ above shows that it contains the factor $(1-Y)$ related only to the material transparency $Y$. Thus, if this signal value were used as the steering servo signal, the system would interpret this factor as edge positional error and would effect improper correction equivalent to establishing a variable margin error as a function of $Y$.

In order to remove this error due to variation in $Y$, $V_1$ must be multiplied by the reciprocal factor $(1)/(1-Y)$ and the circuit means for providing this function will now be described by reference to FIG. 2b wherein an operational amplifier 40 is operated as a summing amplifier for providing current to a lamp 41 in accordance with variations in the transparency $Y$ as monitored by the sensor 23. The summing point is 42 and is common with one terminal of sensor 23, bias resistance $R_6$, feedback resistance $R_5$, and the negative input terminal 43 of the amplifier 40. The positive input terminal 44 is connected to reference ground and a negative bias voltage, of 15 volts, for example, is applied to terminal 45. The output of amplifier 40 is connected to drive a conventional Darlington cascaded emitter follower 46 which supplies current to lamp 41 from a positive supply voltage at terminal 47. It will be noted that the feedback resistance $R_5$ and lamp 41 are connected to the output terminal 48 of the Darlington circuit so that the Darlington circuit can be considered as an inherent part of the operational amplifier.

The lamp 41 is contained in a lightproof box 49 with a photocell 50, the resistance of which is a function of the illuminating intensity provided by lamp 41, which in turn depends on the current supplied thereto as controlled by the reference sensor 23 in the circuit described above.

The reference sensor 23, as seen in FIG. 1, is always fully covered by the material to be sewn. Hence its output current $i_4$ is dependent only on the material transparency Y. This current $i_4$ is zero for opaque materials and it increases as the transparency (Y) increases. At summing point 42, the node equation for the currents shown is:

$$i_5 = i_4 + i_6 \qquad (6)$$

Let $V_L$ = voltage on lamp 41 at terminal 48. Then, by operational amplifier action:

$$V_L = i_5 R_5 \qquad (7)$$

or $$V_L = (i_4 + i_6) R_5 \qquad (8)$$

but $i_6 = (15/R_6)$, therefore $V_L = i_4 R_5 + 15(R_5/R_6)$ (9)

As will become apparent later, it is desirable that the photocell 50 be so controlled by the lamp 41 that its resistance ($R_c$) becomes linearly proportional to the transparency factor (1-Y) of the material to be sewn. Actually this is closely approximated by calibrating the circuit so that the resistance ($R_c$) is one-half its value for Y=0.5 (50 percent transparency) as compared with its value for Y=0 (opaque). This calibration is accomplished as follows:

First, the reference sensor 23 is covered by opaque material making $i_4$=0.

Then, from (9), $V_L = 15(R_5/R_6)$ $R_5$ and $R_6$ are then chosen so that $V_L$ produces a light intensity at lamp 41 such that the resistance $R_c$ of photocell 50 becomes some arbitrary value ($R_{co}$), for example 1,000 ohms. Now a material of known transparency (for example 50 percent, Y=0.5) is placed over the reference sensor 23. The reciprocal factor noted above now becomes (1/1−0.5)=2 and to obtain this factor, $R_c$ should be 500 ohms for this example. The photocell resistance $R_c$ is measured and if it is different than 500 ohms, *both* $R_5$ and $R_6$ are changed to make $R_c$=500 ohms, while keeping the ratio ($R_5/R_6$) unchanged in order *not* to change the calibration for opaque materials. The circuit is now exactly calibrated for two values of transparency, Y=0 and Y=0.5 . The characteristics of commercially obtainable cadmium sulfide photocells have been found to be such that they will give the proper resistance with less than 5 percent error for any transparency (Y) between 0 and 0.5 and less than 15 percent error for (Y) between 0.5 and 0.75 in a circuit calibrated as above described.

There will now be described a multiplier circuit which functions to multiply the output voltage $V_1$ at 31 by the proper multiplier (1/1−Y) in order to compensate for the error created by the partial transparency of the material.

This circuit, like the other two circuits described above, also uses an inverting type summing amplifier 60 having a feedback resistance $R_7$, bias resistance $R_8$ and summing point 61. A positive bias voltage, for example 15 volts, is applied at terminal 62. The photocell 50 is connected in series between the output terminal 31 and the negative input terminal 63 of the amplifier 60, and the positive input terminal 64 is connected to reference ground. The output terminal is designated as 65.

At summing point 61, the node equation, for the currents shown is:

$$i_8 = i_7 - i_9 \qquad (10)$$

But from operational amplifier action, $$i_7 = V_1 / R_c$$

where $V_1 = I_1 (1-Y) [1-X/L)] R_2$ from (5) above, and $R_c = R_{co} (1-Y)$ from calibration of the lamp supply circuit as described above, where $R_{co}$ is the resistance of photocell 50 for opaque material.

Therefore $i_7 = I_1 [1-(X/L)](R_2/R_{co})$ (11)

since $R_2$ and $R_{co}$ are both constant, let $R_2/R_{co} = K$ therefore $i_7 = I_1 K[1-X/L]$ (12)

Now, $i_9 = (15/R_8)$ obviously $R_8$ can be chosen to make $i_9$ any desired value, therefore $i_9 = ZKI_1$, where Z can have values between 0 and 1, and Z=0 represents the condition for edge 16 at the extreme left end of sensor 19 and Z=1 represents the condition for edge 16 at the extreme right end of sensor 19 and thus bias control of $i_9$ controls the position of the reference line 17 as seen in FIG. 1.

Now substituting in (10) above:

$$i_8 = I_1 K[1-X/L] - ZKI_1 \qquad (13)$$

or $$i_8 = KI_1 [(1-Z)-(X/L)] \qquad (14)$$

or, since $KI_1$ is a constant = $K_1$, $$i_8 = K_1 [(1-Z)-(X/L)] \qquad (15)$$

But, if $V_o$ represents the output voltage at terminal 65, $V_o = i_8 R_7$ and from (15) above $$V_o = K_1 R_7 [(1-Z)-(x/L)] \qquad (16)$$

The expression (16) shows that the output voltage $V_o$ contains only one variable (X) and is independent of the transparency of the material.

To determine what value of X make the expression $V_o$=0 which is the function of any steering servo using $V_o$ as the error signal, let [1−Z−X/L)]=0 solving for X, $$X = (1-Z)L \qquad (17)$$

Since values of Z can be fixed (by selecting $R_8$) between Z=0 and Z=1 the following tabular values can be determined:

| Z | X | margin |
|---|---|---|
| 0 | L | minimum |
| 1 | 0 | maximum |
| 0.5 | L/2 | half way (17) |
| 0.25 | ¾L | small |

Thus, by establishing different bias values for $i_9$, various positions (X) for the edge 16 can be controlled over the entire length of the sensor 19. Thus, control of bias current $i_9$, either by a variable bias supply at terminal 62 or with a bias voltage and a variable resistor $R_8$, becomes the margin control for the system.

The accuracy of the compensation circuit depends upon how well the photocell resistance $R_c$ tracks $R_{co}$ (1−Y) for different values of Y. The experimental data shows the following:

for 0<Y<0.5, error is <5 percent for 0.5<Y<0.75, error is <15 percent for 0.75<Y<1.00, error is high Thus the compensation for the circuit of this invention is good for transparencies of less than 75 percent.

FEED RATE CONTROL SIGNAL

It will be obvious from the above that, by using circuitry as shown in FIG. 2b for each of the sensors 20, 21 and 22 shown in FIG. 1, error signals for each sensor in the form of the expression (16) can be derived. Further, if the margin control bias $R_8$ is set to correspond to the reference edge position 17 as indicated in FIG. 1 and the material has a *straight* edge 16 *coinciding with* 17, the error from all sensors would be zero. This represents the *least* complex curvature for the edge 16 and the feed rate should be a maximum because minimum steering is required for correction under this condition.

Curve 16 for the edge, as actually indicated in FIG. 1, represents a somewhat more complex edge curvature than in the case above and it will be noted that the error signals from the various sensors 19–22, which measure the actual deviation of edge 16 from the reference edge position 17 increase as the individual sensor distances from the needle hole 13 increases. It will also be noted that the *absolute differences* in the error signals from successively adjacent sensors rather than the errors themselves truly measure the curvature change. Further, it is noted that the error differences of the sensors more remote from the needle hole should have less effect on the feed rate than those of the sensors nearest the needle hole because more time is available to correct the errors sensed at the distances more remote from the needle hole. Further, it is the *absolute* differences in the individual values of the errors which should control the feed rate because the same amount of time is required by the steering servo system to correct for curvature variation in one direction as in the opposite direction. From the above considerations, a criterion for feed rate control by a single signal can now be established as follows:

Let E= signal for feed rate control and let $e_1$, $e_2$, $e_3$ and $e_4$ be the values of the individual error signals from each of the sensors 19, 20, 21 and 22, respectively, with proper regard for sign.

Then, in accordance with the feed-rate criterion of this invention:

$$E=K_1 |e_2-e_1|+K_2|e_3-e_2|+K_3|e_4-e_3| \quad (18)$$

where $K_1$, $K_2$ and $K_3$ are weighting constants which may have values determined experimentally, but wherein $K_1 > K_2 > K_3$ always, and where $|e_2-e_1|$ denotes the absolute difference between $e_2$ and $e_1$ defined as follows:

for example:

if $e_2=e_1=+5$, $|e_2-e_1|=0$
if $e_2=+5$ and $e_1=-5$, $|e_2-e_1|=+10$
if $e_2=-5$ and $e_1=+5$ $|e_2-e_1|=+10$
if $e_2=-5$ and $e_1=0$ $|e_2-e_1|=+5$
if $e_2=+5$ and $e_1=0$ $|e_2-e_1|=+5$ Expression (18) can be further simplified by noting that the error $e_1$ from sensor 19 will always be relatively small and approach zero due to the servo steering correction.

Thus letting $e_1=0$, (18) becomes $$E=K_1|e_2|+K_2|e_3-e_2|+K_3|e_4-e_3| \quad (19)$$

It will be noted from 19 that the feed rate control signal ($E$) involves edge curvature information sensed in advance of the needle by sensors 20, 21 and 22 and all terms will be positive.

Figure 3:
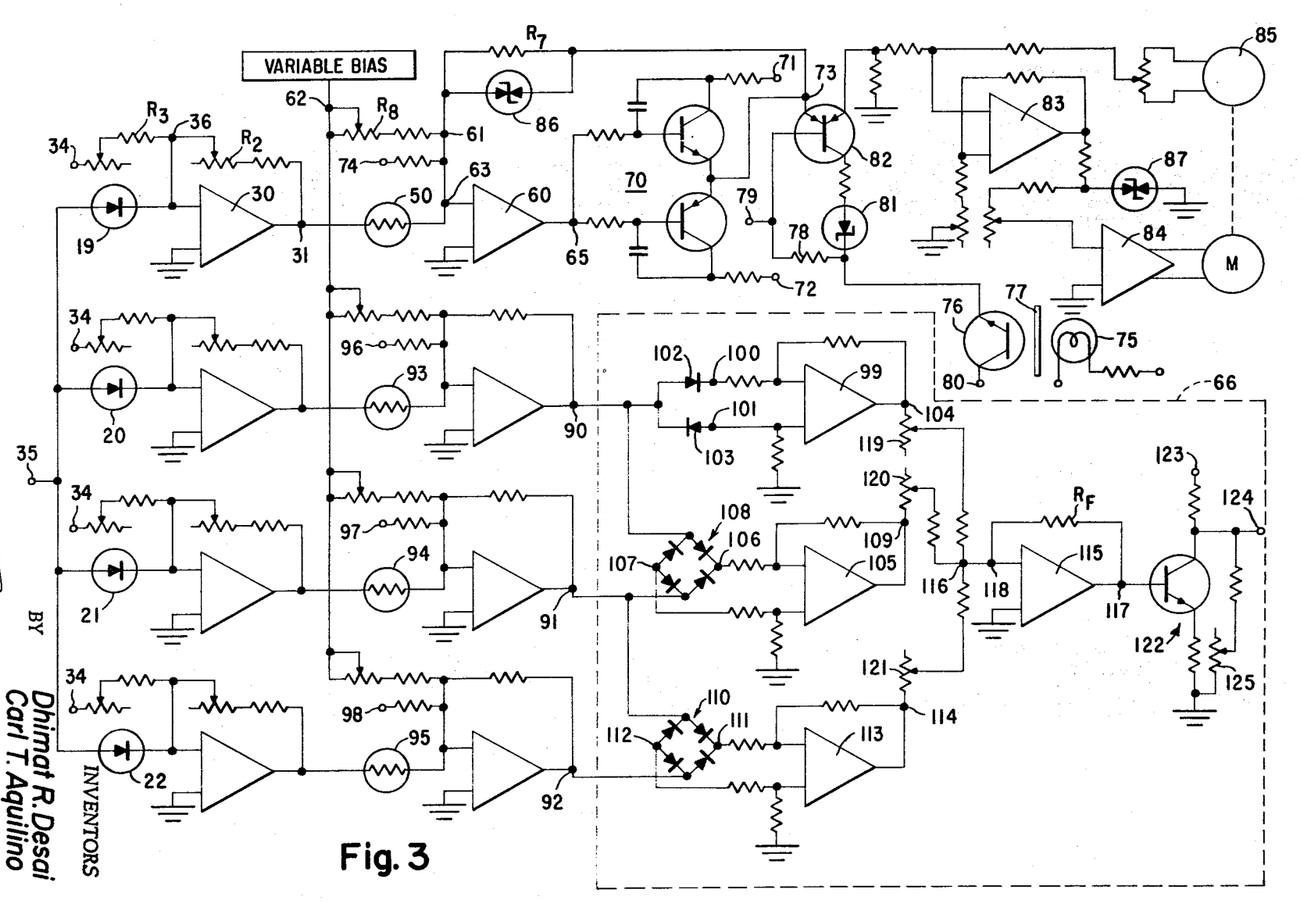
FIG. 3 is a diagram of a complete system for deriving a servo steering signal and a feed rate control signal from edge position and curvature information supplied by the sensors of FIG. 1.

Referring now to FIG. 3, a complete circuit for processing the signals from the sensors 19–23 of FIG. 1 to obtain a steering servo signal and a feed rate control signal will be described.

It will be noted that the signal circuit for the sensor 19 up to the terminal 65 is essentially the same as the basic circuit shown in FIG. 2b except that the feedback circuit containing $R_7$ includes a conventional cascaded complementary output amplifier stage 70 fed from a split power supply at terminals 71 and 72 and having an output terminal 73. Terminal 74 is used for applying an input offset voltage in accordance with well-known procedure for operational amplifiers.

It is essential that the steering correction take place only during the time between the intermittent feeding strokes which impart feeding motion to the work. For this purpose, a position sensor is used to sense the angular position of the armshaft so that the servo signal from terminal 73 will be cut off and cannot actuate servomotor M when the armshaft is in a position corresponding to a feeding stroke. A light source 75 may be positioned to pass light to a phototransistor 76 controlled by the position of a shutter or reflecting sector 77 mounted on the handwheel of the sewing machine.

The phototransistor 76, in response to the light passed by 77, will conduct current through resistance 78 from a voltage supplied at terminals 79 and 80. When the voltage across resistance 78 rises to a threshold level controlled by a Zener diode 81, a conventional integrated transistor chopper 82 is rendered conductive to pass the signal from terminal 73 to a conventional driver amplifier 83 which drives a conventional power amplifier 84 having its output connected to the servomotor M.

A DC tachometer 85 mechanically coupled to the servomotor M provides a velocity feedback signal to the input of amplifier 83, all in conventional manner. Double Zener diodes 86, 87 are used as conventional voltage limiters.

Thus, from the above it will be seen that the error signal from sensor 19, processed to remove the transparency error (1-Y) as above described with respect to FIG. 2b, is used to drive the servomotor M to steer the work by a mechanism (not shown) only during the time between the intermittent feeding strokes as controlled by the chopper 82 responsively to the armshaft sensor 75–77.

Still referring to FIG. 3 it will be seen that the signals from sensors 20, 21 and 22 up to terminals 90, 91 and 92 are handled by circuitry identical to that shown for sensor 19 in FIG. 2b. The respective photocells 93, 94 and 95 are placed in the same lighttight enclosure 49 along with the cell 50 as shown in FIG. 2b, and all cells receive the same illumination from lamp 41 as controlled by the single reference sensor 23 as described above with respect to FIG. 2b. Terminals 96, 97 and 98 supply input offset voltages to the respective operational amplifiers in conventional manner.

Thus, the signals at terminals 90, 91 and 92 are the signals $e_2$, $e_3$ and $e_4$ respectively which appear in the expression (19) derived for the feed rate control signal ($E$). There will now be described a circuit for processing the signals $e_2$, $e_3$ and $e_4$ to derive a single control signal ($E$) in accordance with the expression (19). Such a circuit is shown included within the dashed line 66 of FIG. 3.

The voltage signal $e_2$ at terminal 90 can, of course, be plus or minus with respect to ground. However, expression $|e_2|$ in 19 indicates that the positive absolute value of $e_2$ must be obtained. This is accomplished in an operational amplifier 99 connected in a differential input mode with a polarity switch which always makes one input terminal 100 positive with respect to the other terminal 101 regardless of the polarity at 90. The polarity switch comprises two diodes 102 and 103 connected as shown. Thus the gain of amplifier 99 may be adjusted to unity and the signal at output terminal 104 will always be positive with respect to ground and equal in value to the signal at 90 except for the small forward voltage drop in the diodes 102 and 103. Since the input is single ended with respect to terminal 90 only two diodes are needed.

The operational amplifier 105 is connected in a differential input mode with respect to input terminals 106 and 107. A bridge rectifier 108 has its input terminals connected to terminals 90 and 91 respectively. Thus the input voltage to the bridge 108 is $e_3-e_2$ and may be positive or negative. The output of the bridge 108 is always positive at terminal 106 with respect to terminal 107. Thus the signal at the output terminal 109 of operational amplifier 105 will always be positive with respect to ground and of a value equal to the value of the algebraic difference $e_3-e_2$.

Similarly the signals $e_3$ and $e_4$ from terminals 91 and 92 respectively are presented to the input terminals of bridge rectifier 110 so that input terminal 111 is always positive with respect to terminal 112 and operational amplifier 113 connected in a differential input mode provides at output terminal 114 a single ended output signal equal to $|e_4-e_3|$.

Thus at terminals 104, 109 and 114 there will appear the following signals respectively, $|e_2|$, $|e_3-e_2|$ and $|e_4-e_3|$. These signals are all positive and are single signals referenced to ground.

There now remains the process of weighting each signal with respect to the constants $K_1$, $K_2$ and $K_3$ and combining them to produce a single signal (E) according to the expression (19) above.

This can be accomplished by using an operational amplifier 115 connected as a summing amplifier with summing point 116. A feedback resistance $R_F$ is connected between the output terminal 117 and the input terminal 118 common with the summing point 116. If the resistance between terminal 104 and summing point 116, as adjusted by resistance 119, is equal to $R_A$, then the signal at terminal 117 due to signal $|e_2|$ at 104 is $R_F/R_A |e_2|$.

Similarly if the resistance between terminal 109 and summing point 116, as adjusted by resistance 120, is equal to $R_B$, then the signal at terminal 117 due to signal $|e_3-e_2|$ at 109 is $(R_F/R_B)|e_3-e_2|$.

Also, if the resistance between terminal 114 and summing point 116, as adjusted by resistance 121, is equal to $R_c$, then the signal at terminal 117 due to signal $|e_4-e_3|$ at 114 is $(R_F/R_{ca0})|e_4-e_3|$.

The total signal (E) at terminal 117 will be the sum of the above signal effects and will be:

$$E=R_F/R_A|e_2'|+R_F/R_B|e_3-e_2|+(R_F/R_c)|e_4-e_3| \quad (20)$$

This will be recognized as the same as equation (19) above wherein $K_1=R_F/R_A$, $K_2=R_F/R_B$, and $K_3=R_F/R_C$ Thus, by selecting values of $R_F$, $R_A$, $R_B$ and $R_C$, the values of $K_1$, $K_2$ and $K_3$ can be set to any desired values and the required condition $K_1>K_2>K_3$ satisfied.

It will be noted that the expression for $E$ was derived on the basis that $E=0$ for a straight edge and should result in maximum feed rate. Also as the edge curvature complexity increases, so does the value of $E$, but the feed rate should decrease. Thus there is an *inverse* relation between the value of $E$ and the feed rate. Most motor speed control systems, however, produce a motor speed which varies directly as a function of a reference voltage. The signal at terminal 117 may thus drive a conventional inverter amplifier 122 fed from terminal 123 which provides at terminal 124 an output signal which varies inversely with respect to the signal at 117. An adjustable resistance 125 may be used to set the maximum signal at 124 and thus serve to limit the top speed.

Thus, from the above it will be seen that the individual error signals derived from sensors 20–22 and corrected for transparency error may be further processed by operational amplifiers connected in a differential input mode and having input polarity-fixing diodes to yield single-ended output signals having the absolute difference value demanded by expression (19). Further these signals are combined in an operational adder circuit with feedback and summing resistors adjusted to yield the desired weighting values $K_1$, $K_2$ and $K_3$ as required.

CURRENT-PROCESSING CIRCUIT (FIG. 4)

One possible disadvantage of the signal processing circuitry 66 of FIG. 3 relates to the use of the diodes for fixing the input polarity to the amplifiers 99, 105 and 113.

The error signals at 90, 91, and 92 must supply the forward voltage drops in the series diodes before an effective signal appears at the inputs to the amplifiers. Thus there will be a threshold value for the error signals below which no output voltage will be obtained and this may undesirably limit the sensitivity of the system with respect to low error signals.

This limitation where undesirable, may be removed by a circuit (FIG. 4) which may be substituted for the circuit within the lines 66 of FIG. 3 and which is based upon the combination of currents rather than of voltages.

A common type of speed control for sewing machines involves the control of the "on" time or duty cycle of a clutch for intermittently connecting the sewing machine to a continuously running motor. A unijunction transistor is commonly used in a conventional relaxation oscillator circuit to provide periodic energization of the clutch and the frequency of the oscillator determines the speed of the sewing machine.

Figure 4:
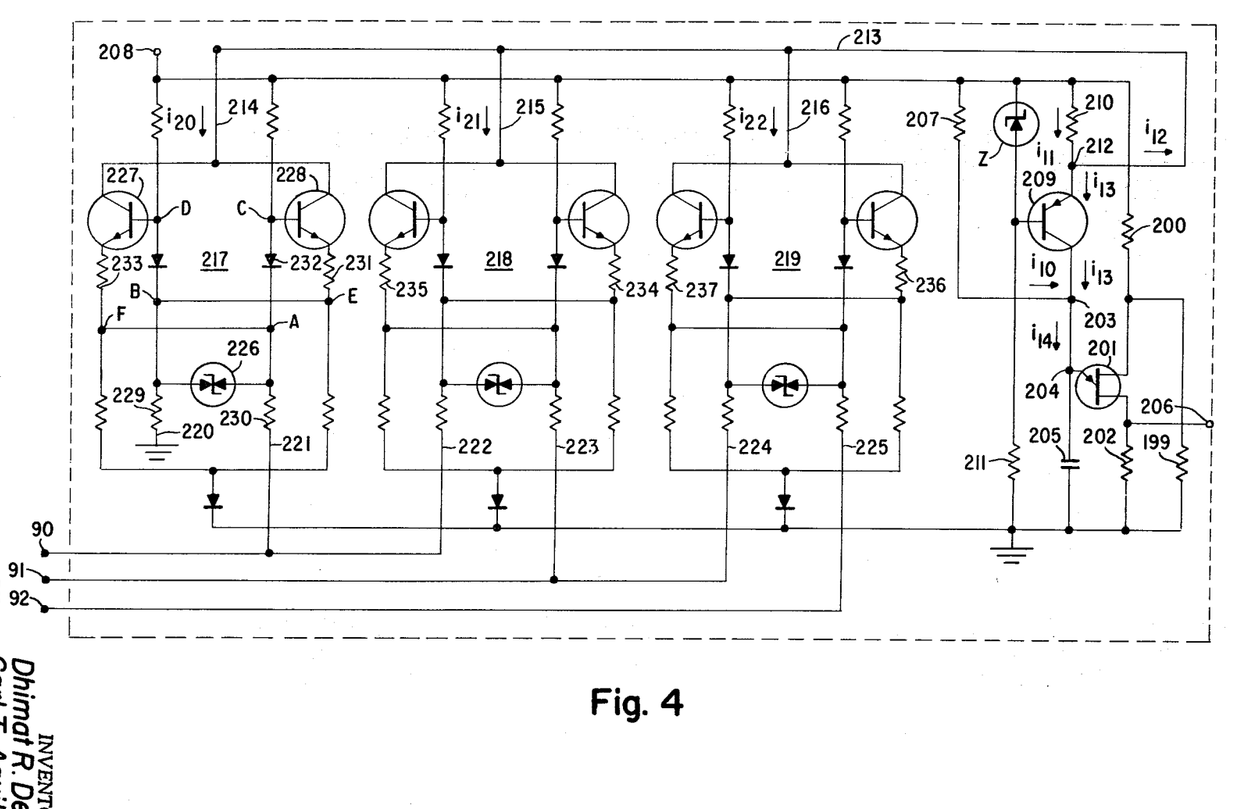
FIG. 4 is a diagram of a circuit for deriving a current signal for controlling the feed rate from the same input information as in FIG. 3.

Referring now to FIG. 4, resistances 199, 200 and 202, in conjunction with the base-to-base resistance of the unijunction transistor (UJT) 201, form a voltage divider and establish a threshold for the emitter voltage at 204 at which the UJT will conduct and discharge the current from the capacitor 205 through resistance 202 to provide a trigger pulse at terminal 206 to control the energization of a clutch (not shown). The UJT turns off and the capacitor is again charged to repeat the cycle as is well known and described on page 76 of the General Electric SCR Manual, 4th Edition, published in 1967. Ordinarily the resistance 207 provides the only path for the charging current $i_{10}$ to capacitor 205 from a positive voltage at terminal 208 and thus controls the oscillator frequency. However, here a transistor 209 is used to provide a second charging path for capacitor 205 from 208 through resistance 210. A Zener diode Z is connected in series with resistance 211 and operates to hold a constant current $i_{11}$ through resistance 210.

At junction 212 a path for current $i_{12}$ is provided by a current control circuit which will be later described in detail and for which the value of $i_{12}$ varies from 0 to a maximum equal to $i_{11}$ responsively to the edge curvature complexity as sensed by the sensors 20, 21 and 22 of FIG. 3.

Thus at junction 212, $$i_{13} = i_{11} - i_{12} \quad (21)$$

where $i_{13}$ is the collector current of transistor 209 (neglecting the small base current).

At junction 203 the current $i_{10}$ from resistance 207 combines with collector current $i_{13}$ to produce $i_{14}$ which is the total charging current for the capacitor 205.

Thus $i_{14} = i_{10} + i_{13}$ (22)
or from (21) $i_{14} = i_{10} + i_{11} - i_{12}$ (23)

Thus, for $i_{12} = i_{11}$ (which as will be shown later corresponds to maximum edge curvature complexity),
(23) becomes $i_{14} = i_{10}$ and resistance 207 can be chosen to make the oscillator frequency such as to correspond to a minimum sewing machine speed of say 200 r.p.m. under this condition.

As the edge curvature complexity decreases so does the value of $i_{12}$ until, for a straight edge, $i_{12} = 0$.

Thus from (23), $i_{14} = i_{10} + i_{11} =$ maximum value for $i_{14}$. 210 $i_{11}$ can be determined by the breakdown voltage of the Zener diode and the value of resistance 210 to have a value such that the maximum value of $i_{14}$ produces a maximum oscillator frequency and corresponds to a maximum speed for the sewing machine, say 5,500 r.p.m.

Thus there remains to describe a current control circuit which will control the value of $i_{12}$ between $i_{12} = 0$ and $i_{12} = i_{11}$ in accordance with the following expression:

$$i_{12} = K_1 |e_2| + K_2 |e_3 - e_2| + K_3 |e_4 - e_3| \quad (24)$$

where $K_1$, $K_2$, $K_3$, $e_2$, $e_3$ and $e_4$ represent the same quantities as in expression (19) above.

Still referring to FIG. 4, it will be noted that line 213 which connects to junction 212 also has branches 214, 215 and 216 which connect respectively to three identical subcircuits 217, 218 and 219 as shown. Terminals 90, 91 and 92 are the same terminals as those indicated by the same number in FIG. 3. Thus there appears at 90, 91 and 92 the respective signals $e_2$, $e_3$ and $e_4$ already identified. Thus the inputs to subcircuit 217 are 0 (or ground) on line 220 and $e_2$ on line 221. Similarly for subcircuit 218, the inputs are $e_2$ on line 222 and $e_3$ on line 223; and for subcircuit 219, the inputs are $e_3$ on line 224 and $e_4$ on line 225.

Each subcircuit is made up of two identical sides, one for the positive differences between the two inputs and the other for the negative differences between the two inputs. The operation of subcircuit 217 will now be explained in detail and the operation of the other subcircuits 218 and 219 will follow the same explanation and therefore will not be repeated.

The function of subcircuit 217 is to control the current $i_{20}$ in branch 214 such that its value is directly proportional to the absolute difference between the inputs on lines 220 and 221.

The Zener diode 226 provides protection so that the voltage between the inputs on 220 and 221 does not exceed 6 volts to provide breakdown due to excessive reverse emitter-to-base voltage on transistors 227 and 228. The resistors 229 and 230 may be small so as not to significantly change the input voltages.

To enable certain voltages to be identified, the junctions as shown between certain components are indicated by the letters A–F.

Assume that $e_2$ on line 221 is *positive* with respect to ground on line 220 and that normal voltage drops in resistances 229 and 230 are insignificant. Then the voltage between $A$ and $B$ $=V_{AB}=e_2$.

Let the voltage between junctions $C$ and $E$ $=V_{CE}$

Then the voltage across emitter resistance $231 = V_{231} = V_{CE} - V_{be}$, where $V_{be}=$ base-to-emitter drop of transistor 228, But $V_{CE}=V_{AE}+V_{diode}$ where $V_{AE}$ is the voltage between junctions $A$ and $E$, and $V_{diode}$ is the drop in diode 232.

Therefore $V_{231}=V_{AE}+V_{diode}-V_{be}$
and since $V_{diode}=V_{be}$ (closely)
$V_{231}=V_{AE}=V_{AB}=e_2$ The base-emitter junction of transistor 227 is reverse biased and the transistor 227 is cut off because $V_{BA}=V_{BF}$ is negative. Therefore, under the condition $V_{AB}=e_2=positive$, the current $i_{20}$ in branch 214 must equal the collector current in the conducting transistor 228 and this is the current in resistance 231, provided the base current of transistor 228 is neglected.

Therefore $i_{20}=(V_{231}/R_{231})=(e_2/R_{231})$ where $R_{231}$ is the resistance value of 231. Now, the resistance 231 can be chosen to make ($1/R_{231})\Theta_1$ and $i_{20}=K_1 e_2$ It can be shown that if $V_{AB}=e_2$ is *negative*, transistor 228 will be cut off and transistor 227 will conduct. Therefore $_{20}=($ $e_2/R_{233}R_{233}$ is the resistance value of emitter resistance 233 of transistor 227. Thus if $R_{233}=R_{231}$, $i_{20}$ will be the same for the same input signal regardless of the relative polarity of the input lines 220 and 221. Further, if the value of $R_{231}=R_{233}$ is made such that ($1/R_{231})\Theta_1$, then $i_{20}=K_1|e_2|$.

From the above, the operation of the subcircuit 217 may be summarized as follows: Only one transistor (227 or 228) will conduct at any one time depending on the relative polarity of the inputs. If there is no difference between the inputs, neither transistor will conduct and $i_{20}=0$. The conduction depends proportionally on the value of the difference and the proportionality factor depends essentially on the value of the emitter resistance. The current $i_{20}$ is always in the same direction regardless of the input polarity.

Subcircuits 218 and 219 operate in the same manner as subcircuit 217 above described. Thus the current $i_{21}$ in the branch 215 will have the following value: $i_{21}=K_2|e_3-e_2|$ where $e_2$ and $e_3$ are the signals on respective input lines 222 and 223 with respect to ground, and $K_2$ is controlled by the common resistance value of the emitter resistances 234 and 235.

Similarly, the current $i_{22}$ in the branch 216 will have the value $i_{22}=K_3|e_4-e_3|$, where $e_3$ and $e_4$ are the signals on respective input lines 224 and 225 with respect to ground, and $K_3$ is controlled by the common resistance value of the emitter resistances 236 and 237.

Thus $i_{1z}=i_{20}+i_{21}+i_{22}$ (25)

or from the above $i_{1z}=K_1|e_2|+K_2|e_3-e_2|+K_3|e_4-e_3|$ which is the same as expression (24).

From the foregoing description it will be seen that the error signals from the sensors 20–22 and corrected for transparency error, may be further processed in a current control circuit to yield a single positive current signal demanded by the expression (24) which may be used to control the frequency of an oscillator used in conventional manner to control the duty cycle of a clutch for speed control of a sewing machine. The proper and important weighting of the error signal information obtained from the individual sensors in accordance with the teachings of this invention may readily be accomplished by the selection of certain circuit parameters.

It will be understood that three sensors, 20, 21 and 22 for deriving edge curvature information are shown by way of example only and that any number of sensors could be used depending on the amount of information required and therefore that the scope of this invention is not limited to any specific number of sensors.

Having thus set forth the nature of the invention, what is claimed herein is:

1. A photoelectric sensing system for a sewing machine edge-guiding system for handling both opaque and partially transparent material, comprising:
    a. a plurality of photoelectric sensors positioned beneath the material to be sewn and at increasing distances from and in advance of the needle with respect to the direction of feed,
    b. said sensors each extending laterally on both sides of a reference edge position defined by a straight line parallel to the direction of feed,
    c. common means for illuminating said sensors from the side of said material being sewn opposite to the sensors,
    d. first signal-processing means deriving from each sensor a processed signal having a value related only to the deviation of the actual position of the material edge at the respective sensor from the reference edge position and having a sign related to the direction of the deviation,
    e. circuit means selecting the processed signal from the sensor nearest the needle for controlling the steering of the material being sewn,
    f. further signal-processing means deriving from said first processed signals a single composite signal having a value related to the edge curvature complexity in advance of the needle, and
    g. circuit means selecting the composite signal for controlling the feed rate of the sewing machine.

2. A photoelectric sensing system for a sewing machine edge-guiding system for handling both opaque and partially transparent material comprising:
    a. a plurality of photoelectric sensors positioned beneath the material to be sewn and at increasing distances from and in advance of the needle with respect to the direction of feed,
    b. said sensors each extending laterally on both sides of a reference edge position defined by a straight line parallel to the direction of feed,
    c. common means for illuminating said sensors from the side of said material being sewn opposite to the sensors,
    d. signal processing mans deriving from each sensor a processed output signal $e_1, e_2...e_n$, where $e_1$ represents the processed output signal from the sensor nearest the needle and $e_n$ represents the processed output signal from the sensor most remote from the needle,
    e. said processed signals each having a value related only to the deviation of the actual position of the material edge at the respective sensor from the reference edge position and having a sign related to the direction of the deviation,
    f. circuit means selecting the output signal $e_1$ for controlling the steering of the material being sewn,
    g. circuit means for deriving a single composite signal (E) having the following expression: $E=K_1|e_2|+K_2|e_3-e_2|+...K_{n1}|e_n-e_{n1}|$, where $K_1...K_2...K_{n1}$ are constants related to the relative position of the sensors and which may be selected by adjustment of circuit parameters, but wherein $K_1>K_2>..K_{n1}$ always and where $|e_n-e_{n1}|$ denotes the absolute difference between $e_n$ and $e_{n1}$, and
    h. circuit means selecting the composite signal (E) for controlling the feed rate of the sewing machine.

3. In an edge-guiding system for a sewing machine, means for generating a first signal for controlling the steering of opaque or partially transparent material to be sewn by said sewing machine and a second signal for controlling the feed rate of said sewing machine comprising:
    a. a plurality of photoelectric sensors positioned beneath the material to be sewn and at increasing distances from and in advance of the needle with respect to the direction of feed,
    b. said sensors each extending laterally on both sides of a reference edge position defined by a straight line parallel to the direction of feed,
    c. a reference sensor positioned to one side of but abreast of the needle with respect to the direction of feed so that said reference sensor is entirely covered by said material in normal operation of the sewing machine,
    d. common means for illuminating all of said sensors from the side of the material opposite to the sensors,
    e. means deriving from each of said plurality of sensors an output signal having a value related to both the deviation of the actual position of the edge from the reference edge position at the respective sensor and to the transparency of the material being sewn,
    f. means deriving from said reference sensor an output signal having a value related only to the transparency of the material being sewn,
    g. means responsively to the output signal from the reference sensor for modifying the output signals from each of said plurality of sensors to produce corrected signals which are related only to the actual edge position at each sensor and are independent of the variation in material transparency,
    h. means selecting the corrected output signal from the sensor nearest the needle for controlling the steering of said material,
    i. circuit means combining the corrected output signals from the remaining sensors to produce a composite output signal having, as component signals, the absolute value of the corrected output signal from the sensor next nearest the needle and the absolute differences between the corrected output signals from the remaining successively adjacent sensors, j. circuit means for weighting the contribution of each of the component signals of the composite signal in a manner inversely related to the distance of the respective sensors from the needle as measured in the line of feed, and k. means selecting the composite signal for controlling the feed rate of the sewing machine.

4. In an edge-guiding system for a sewing machine, means for generating a signal for controlling the steering of opaque or partially transparent material to be sewn by said sewing machine in accordance with information related to the actual position of the edge just prior to sewing and to the transparency of said material comprising:

a. a first photoelectric sensor positioned beneath the material to be sewn and in advance of the needle with respect to the direction of feed, b. said sensor extending laterally on both sides of a reference edge position defined by a straight line parallel to the direction of feed, c. a second photoelectric sensor positioned to one side of but abreast of the needle with respect to the direction of feed so that said sensor is entirely covered by said material in normal operation of the sewing machine, d. common means for illuminating said sensors from the side of the material to be sewn opposite to the sensors, e. means deriving an output signal from the first sensor having a value related both to the deviation of the actual position of the edge from the reference edge position and to the transparency of the material being sewn, f. means deriving an output signal from the second sensor having a value related only to the transparency of the material to be sewn, g. a photoresistor and means for controlling the resistance of said photoresistor responsively to the output signal of the second sensor, and h. means responsively to the resistance of said photoresistor for modifying the output signal from the first sensor by a factor to produce an output signal which is related to the actual edge position and is independent of the variation in transparency.

5. Apparatus according to claim 4, wherein the means for modifying the output signal from the first sensor includes:

a. a summing operational amplifier having an input terminal, b. means connecting the photoresistor in series between the output signal from the first sensor and said input terminal, and c. adjustable bias means for selecting a reference edge position.

6. Apparatus according to claim 4, wherein the means for controlling the resistance of said photoresistor includes:

a. a summing operational amplifier having bias and feedback resistances, b. means connecting the output signal from the second sensor to the input of said amplifier, c. a lamp connected to the output of said amplifier and providing the sole illumination for said photoresistor, and d. said bias and feedback resistances having values which make the resistance of the photoresistor, when the second sensor is covered by material of 50 percent transparency, equal to one-half its value when the second sensor is covered by opaque material.

7. Apparatus according to claim 6, wherein:

a. the summing operational amplifier includes a cascaded emitter follower amplifier to supply current to the lamp.

8. In an edge-guiding system for a sewing machine, means for generating a signal for controlling the feeding rate of said sewing machine in accordance with information related to the complexity of the edge contour, comprising:

a. a plurality of photoelectric sensors positioned beneath the material to be sewn and at increasing distances from and in advance of the needle with respect to the direction of feed, b. said sensors each extending laterally on both sides of a reference edge position defined by a straight line parallel to the direction of feed, c. common means for illuminating said sensors from the side of said material to be sewn opposite to the sensors, d. means deriving an output signal from each sensor having a value related to the deviation of the actual position of said edge at the respective sensor from the reference edge position, e. means combining said output signals to produce a composite output signal having, as component signals, the absolute value of the output signal of the first sensor and the absolute differences between the output signals of successively adjacent sensors, and f. means for weighting the contribution of each of said component signals of the composite signal in a manner inversely related to the distance of the respective sensors from the needle as measured in the line of feed.

9. Apparatus according to claim 8, wherein the means combining the output signals includes:

a. operational amplifiers each connected in a differential input mode, b. rectifier means connected to each of the inputs of said amplifiers to provide a fixed relative polarity thereto, and c. means connecting the output signals from the adjacent sensors to the respective inputs of said rectifier means so that the outputs of the amplifier are single-ended signals proportional to the absolute differences of the output signals from adjacent sensors.

10. Apparatus according to claim 9, wherein a. a summing operational amplifier is used to add the output signals from the differential amplifiers, and b. a resistance summing network has different resistances to control the gain with respect to each input signal whereby the contribution of each input signal to the composite output signal may be controlled.

11. A photoelectric sensing system for a sewing machine comprising:

a. a plurality of photoelectric sensors positioned beneath the material to be sewn and at increasing distances from and in advance or the needle with respect to the direction of feed, b. said sensors each extending laterally on both sides of a reference edge position defined by a straight line parallel to the direction of feed c. common means for illuminating said sensors from the side of said material being sewn opposite to the sensors, d. means deriving from each sensor output signals $e_1$, $e_2 e_n$, where $e_1$ represents the signal from the sensor nearest the needle and $e_n$ represents the signal from the sensor most remote from the needle, e. said signals each having a value related only to the deviation of the actual position of the edge at the respective sensor from the reference edge position and a sign related to the direction of the deviation and f. circuit means for deriving a single composite signal (s) having the following expression: $S = K_1|e_2-e_1| + K_2|e_3-e_2| + ... K_{n1}|e_n-e_{n1}|$, where $K_1, K_2...K_{n1}$ are constants related to the relative position of the sensors and which may be selected by adjustment of circuit parameters, but wherein $K_1 > K_2 ... > K_{n1}$ always and where $|e_n-e_{n1}|$ denotes the absolute difference between $e_n$ and $e_{n1}$ and wherein $S$ may be either a voltage or a current.

PO-1050
(5/69)

UNITED STATES PATENT OFFICE
CERTIFICATE OF CORRECTION

Patent No. 3,609,373          Dated September 28, 1971

Inventor(s) Dhimat R. Desai and Carl T. Aquilino

It is certified that error appears in the above-identified patent and that said Letters Patent are hereby corrected as shown below:

Column 11, line 2 " $\Theta_1$ " should be $=K_1$ --;

Column 11, line 4 after " therfore " insert --i--;

Column 11, line 9 " $\Theta_1$ " should be - $=K_1$ ---

Signed and sealed this 16th day of May 1972.

(SEAL)
Attest:

EDWARD M. FLETCHER, JR.          ROBERT GOTTSCHALK
Attesting Officer          Commissioner of Patents